United States Patent
Falk et al.

(10) Patent No.: US 9,628,278 B2
(45) Date of Patent: Apr. 18, 2017

(54) METHOD FOR THE SECURE UNINDIRECTIONAL TRANSMISSION OF SIGNALS

(75) Inventors: Rainer Falk, Poing (DE); Steffen Fries, Baldham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 749 days.

(21) Appl. No.: 13/583,970

(22) PCT Filed: Feb. 14, 2011

(86) PCT No.: PCT/EP2011/052103
§ 371 (c)(1),
(2), (4) Date: Sep. 11, 2012

(87) PCT Pub. No.: WO2011/110402
PCT Pub. Date: Sep. 15, 2011

(65) Prior Publication Data
US 2013/0010954 A1    Jan. 10, 2013

(30) Foreign Application Priority Data
Mar. 11, 2010   (DE) .................. 10 2010 011 022

(51) Int. Cl.
*H04L 29/06* (2006.01)
*H04L 9/32* (2006.01)
(52) U.S. Cl.
CPC .......... *H04L 9/3236* (2013.01); *H04L 9/3271* (2013.01); *H04L 63/0442* (2013.01); *H04L 63/123* (2013.01)
(58) Field of Classification Search
USPC ........................................................ 380/255
See application file for complete search history.

(56) References Cited

U.S. PATENT DOCUMENTS 5,841,866 A * 11/1998 Bruwer et al. .................. 705/66
6,154,544 A * 11/2000 Farris ................. G07C 9/00182
340/5.26

(Continued)

FOREIGN PATENT DOCUMENTS

CN  1894671  1/2007
CN  2888514  4/2007

(Continued)

OTHER PUBLICATIONS

Tassos Dimitriou, "A Lightweight RFID Protocol to protect against Traceability and Cloning attacks," Computer Society, IEEE, Proceedings of the First International Conference on Security and Privacy for Emerging Areas in Communications Networks, 2005, 8 pages.

(Continued)

*Primary Examiner* — Harris C Wang
(74) *Attorney, Agent, or Firm* — Slayden Grubert Beard PLLC

(57) ABSTRACT

A method transmits a signal using a unidirectional communications link, which is protected by an asymmetric cryptography method. A counter value is incremented by a transmitter during a transmission operation. Subsequently, a challenge is determined by the transmitter on the basis of the counter value and a control command that can be executed by a receiver and, on the basis of the challenge that is determined a response is in turn determined. The challenge and the response are transmitted from the transmitter to the receiver. The challenge received is then checked by the receiver to see whether the counter value used in the challenge is greater than a counter value previously stored by the transmitting transmitter. The response received is checked on the basis of the challenge. Following successful (Continued)

checking of the challenge and response, the control command transmitted in the challenge is executed.

11 Claims, 3 Drawing Sheets

(56) References Cited

U.S. PATENT DOCUMENTS

| | | | |
|---|---|---|---|
| 6,430,690 B1* | 8/2002 | Vanstone | G06Q 20/341 713/161 |
| 7,278,582 B1 | 10/2007 | Siegel et al. | |
| 8,656,169 B2 | 2/2014 | He | |
| 8,812,848 B2 | 8/2014 | He | |
| 9,094,818 B2* | 7/2015 | Falk | H04L 9/3242 |
| 2003/0210787 A1* | 11/2003 | Billhartz | H04L 63/0435 380/270 |
| 2005/0138046 A1 | 6/2005 | Miettinen et al. | |
| 2008/0044014 A1* | 2/2008 | Corndorf | H04L 63/12 380/37 |
| 2009/0235083 A1 | 9/2009 | Bleahen | |
| 2010/0011220 A1 | 1/2010 | Zhao et al. | |
| 2010/0095123 A1 | 4/2010 | He | |
| 2010/0268949 A1* | 10/2010 | Schuetze | H04L 9/002 713/168 |
| 2013/0010954 A1* | 1/2013 | Falk | H04L 9/3236 380/255 |
| 2014/0120879 A1 | 5/2014 | He | |
| 2014/0295800 A1 | 10/2014 | He | |

FOREIGN PATENT DOCUMENTS

| | | |
|---|---|---|
| CN | 101132281 | 2/2008 |
| CN | 101222322 | 7/2008 |
| CN | 101272301 | 9/2008 |
| CN | 101272616 | 9/2008 |
| CN | 101378591 | 3/2009 |
| DE | 10 2010 011 022.1 | 3/2010 |
| EP | 0 898 216 | 2/1999 |
| WO | 2009/158086 | 12/2009 |
| WO | PCT/EP2011/052103 | 2/2011 |

OTHER PUBLICATIONS

European Office Action for related European Patent Application No. 11704056.8, mailed Jul. 26, 2013, 8 pages.
Chinese Office Action for related Chinese Patent Application No. 201180013475.9, issued Nov. 24, 2014, 12 pages, including partial English and German Translations.
Chinese Office Action for related Chinese Patent Application No. 201180013475.9, issued Apr. 19, 2014, 22 pages (including partial German and English Translations).
A. Menezes et al., "Handbook of Applied Cryptography," CRC Press, 1997, pp. 385-435.
S.H. Brackin, "Automatically Detecting Most Vulnerabilities in Cryptographic Protocols," IEEE, Proceedings of DARPA Information Survivability Conference and Exposition, Jan. 25-27, 2000, vol. 1, pp. 222-236.
John Clark et al., "A Survey of Authentication Protocol Literature: Version 1.0," Nov. 17, 1997, downloaded Oct. 26, 2010, http://www.eis.mdx.ac.uk/staffpages/mcheng/link/clarkjakob.pdf, pp. 1-109.
International Search Report for PCT/EP2011/052103, mailed on Apr. 13, 2011.
German Office Action for German Priority Patent Application No. 10 2010 011 022.1, issued on Oct. 28, 2010.

* cited by examiner

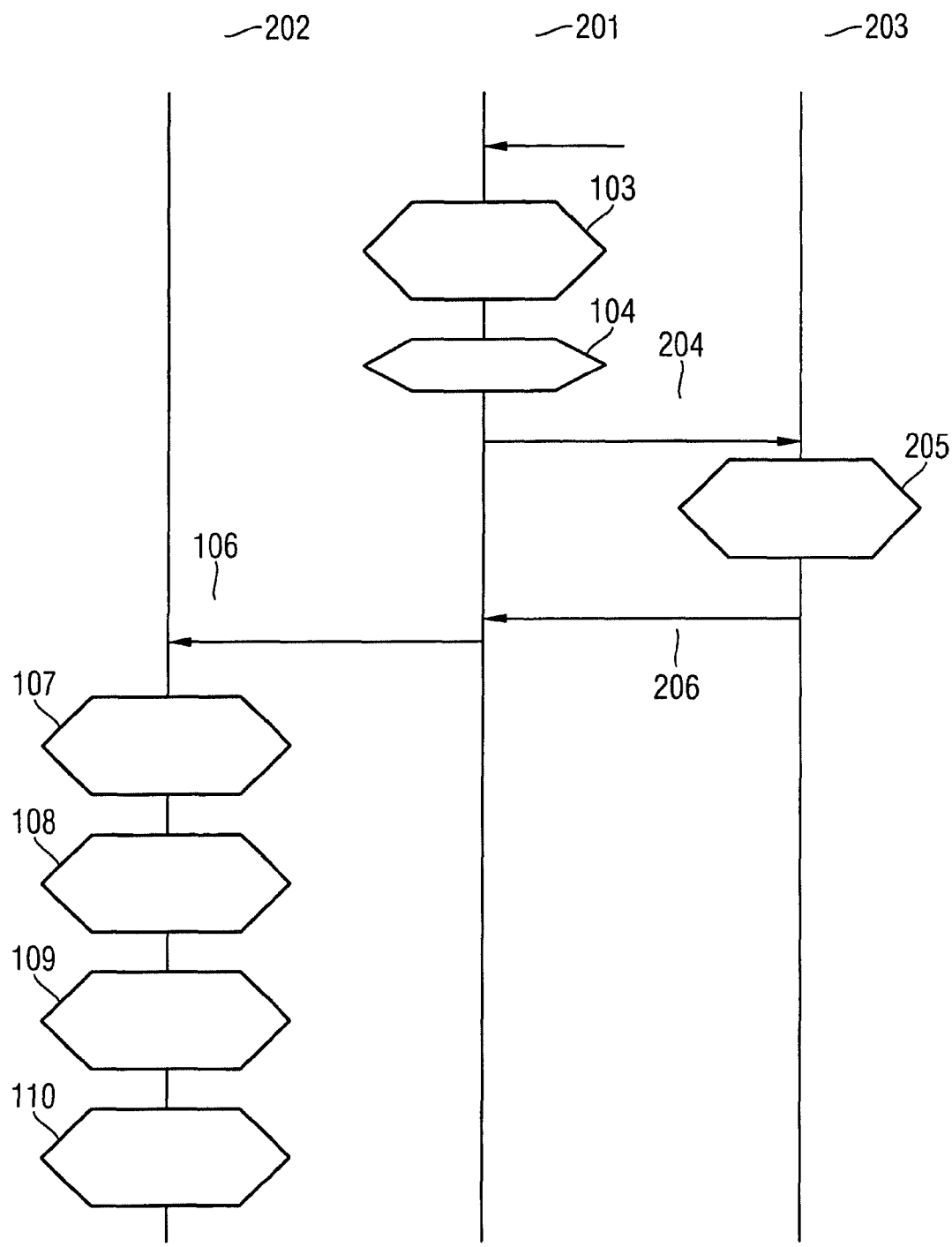

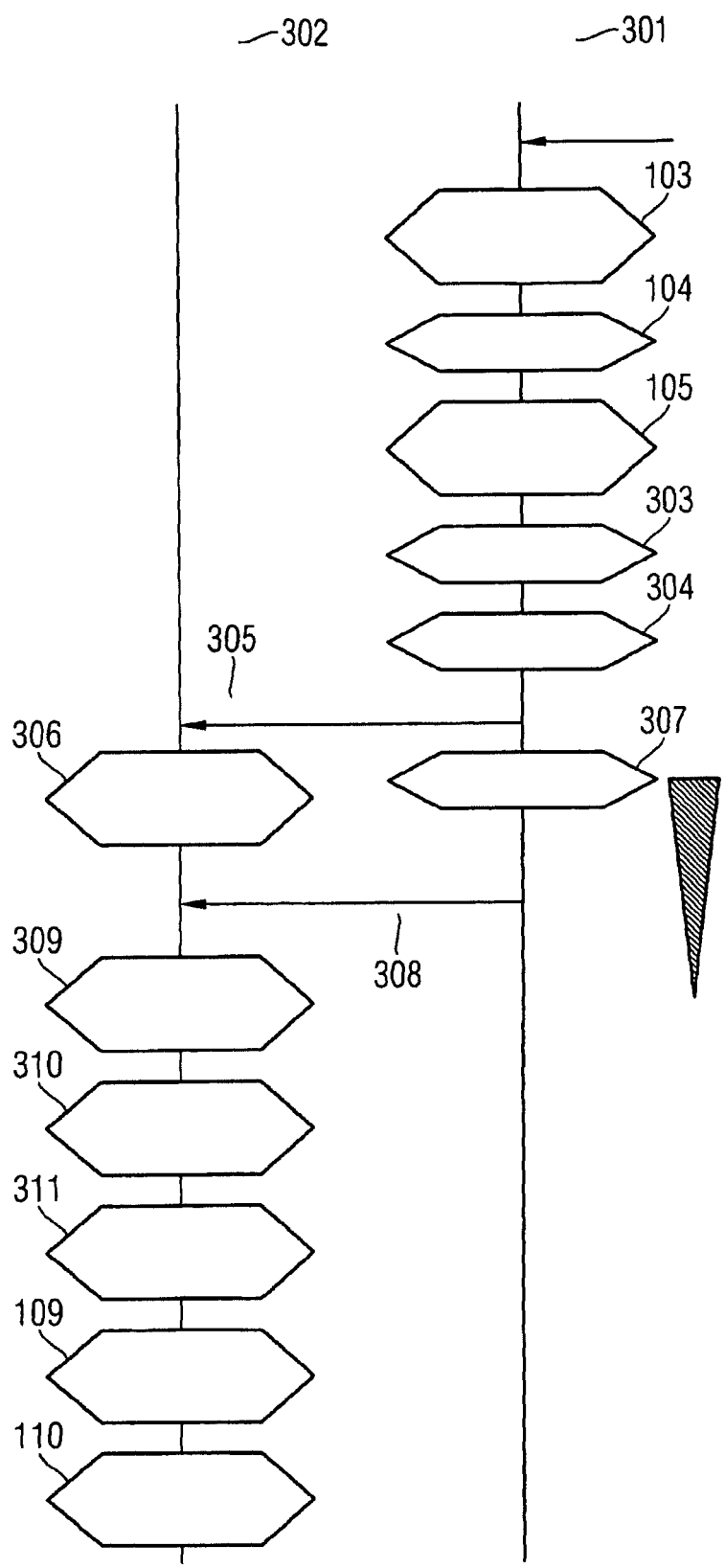

METHOD FOR THE SECURE UNINDIRECTIONAL TRANSMISSION OF SIGNALS

CROSS REFERENCE TO RELATED APPLICATIONS

This application is based on and hereby claims priority to International Application No. PCT/EP2011/052103 filed on Feb. 14, 2011 and German Application No. 10 2010 011 022.1 filed on Mar. 11, 2010, the contents of which are hereby incorporated by reference.

BACKGROUND

The invention relates to a method, a transmitter, and a receiver for the secure unidirectional transmission of a signal, making use of an asymmetric cryptography method.

Unidirectional transmissions of signals are used, for example, in remote control systems for the issue of a control command, since in these cases there is usually no response message required. Examples of such remote control systems are radio keys for the locking and unlocking of motor vehicles, wireless garage door openers, or remote control devices in the entertainment electronics sector. In addition to these, for example, status information such as temperature or tremors, is transferred unidirectionally by wireless sensors. Such unidirectional transmission is energy-saving, since only one single message is sent, and no connection needs to be established beforehand. As well as this, it is usually possible to do without a receiver part, which makes the systems concerned economical to manufacture.

With a unidirectional transmission, however, in most application situations there is a need for a secure transmission of the signals which is protected against manipulation. To provide secure unidirectional transmission, what is referred to as the KeeLoq protocol is known. In this protocol, a symmetrical key is used for the encryption of the transmitted signals. In a symmetrical encryption method, transmitters and receivers are provided with the same key, in order for the transmitter to be able to encrypt the message with this key and the receiver can decrypt it. In order to introduce a new transmitter to a receiver, it is therefore necessary, using a suitable method, for a specific symmetrical key to be agreed on between the transmitter and the receiver. In practice, such methods are used in which a symmetrical system key is stored at the receiver by the manufacturers. On the basis of a transmitter-specific item of information, such as a serial number, a transmitter-specific key can then be calculated by the receiver. To do this, the transmitter transmits, for example, in a learning phase, its serial number to the receiver, which thereupon, with the aid of the system key, determines the transmitter-specific key. On the transmitter side, the transmitter-specific key is already stored by the manufacturer. This means that, after this learning phase, both the transmitter and the receiver have a common key available to them, with which the messages can be encrypted and decrypted respectively.

A problem with such a method, however, is the fact that a system key is stored on each receiver. An attacker who is in possession of only one receiver can read out the system key and, with this knowledge, can reconstruct the keys of any transmitter at will.

With another method, in order to agree on a symmetrical key between transmitter and receiver, the transmitter key is transmitted unencrypted in a learning phase. This also incurs the risk, however, that an attacker can tap the transmitter key in a manipulated learning phase.

Apart from this, in both methods a learning phase must be run through, which is to be initiated by the user. This involves additional effort and expenditure for the user, with the result that the additionally required learning phase renders the methods described more prone to error and less user-friendly.

The documents by A. Menezes, P. van Oorschot, S. Vanstone: "Handbook of Applied Cryptography", CRC Press, 1997, pages 385 to 435, and J. Clark, J. Jacob, "A Survey of Authentication Protocol Literature: Version 1.0", 17 Nov. 1997, describe a unilateral authentication method between a transmitter and a receiver. Within the framework of this authentication, a time stamp and a receiver identification are transmitted, as well as a digital signature, which is formed by the time stamp and the receiver identification. In this situation, the receiver can check the correctness of the time stamp, as well as, by the public key of the transmitter, the correctness of the signature.

In the printed specification U.S. Pat. No. 7,278,582 B1, a hardware security module in the form of a chip card is described.

SUMMARY

One potential object is to provide a method for the unidirectional transmission of signals which is more secure and more user-friendly than methods known hitherto.

The inventors propose a method for the transmission of a signal with a unidirectional communications link is protected by an asymmetric cryptography method. To this end, a counter value is incremented by a transmitter during a transmission operation. Subsequently, a challenge is determined by the transmitter on the basis of the counter value and a control command that can be executed by a receiver and, on the basis of the challenge which is determined, a response is in turn determined. The challenge and the response are transmitted from the transmitter to the receiver. According to the proposal, both the challenge and the response relating to it are determined by the transmitter. In this way, an asymmetric cryptography method can be used, which is usually designed for bidirectional communications links. The counter is, for example, a 16 bit, 32 bit, or 64 bit counter. The response is determined by an asymmetric cryptographic method such as, for example, RSA, ECC (Elliptic Curve Cryptography) such as ECC-DSA, or Diffie-Hellman, making use of a private asymmetric key. The term "incrementing" the counter value is understood to mean, in particular, raising it by the value 1. It is also possible, however, by analogy, for another calculation system to be taken as a basis, with which, for example, counting is backwards (i.e. the counter value is reduced by the value 1). Accordingly, it is likewise possible to increment by other values (e.g. +2, +5, +7) or reduce by other values (e.g. −2, −5, −7). Other calculation operations can also be used, e.g. multiplication by a value (e.g. 2, 3, 5, 7), in order to determine the next counter value. In another variant, a random value is used as the counter value, wherein, at the incrementing of the counter, a new random number is calculated (e.g. by a pseudo-random number sequence generator).

In a further embodiment, the message comprising the challenge is transmitted several times, in order that, even in the event of transmission errors, the control command will be reliably transmitted. In this situation, the counter value can be incremented with every message or remain unchanged with every repeated transmission. The receiver accepts this same counter value, as long as messages with this counter value are received with a certain regularity. In one variant, the receiver stores a counter reference value. On receipt of a message the receiver checks whether the counter value used in this situation has been incremented in comparison with the stored counter reference value. Only with a counter value which has been incremented once or, alternatively, several times, will a control command encoded in the message be executed. In this situation, the counter reference value will be set to the counter value used in the message. As soon as no control message with this counter value is received for a certain period of time, this counter value becomes invalid. In addition to this, the receiver can check whether the same control command with this counter value is being transmitted. In this situation, the control command encoded in the message is for preference only executed once for a constant counter value.

In a further embodiment, for the initialization a receiver stores an item of identification information of a transmitter, wherein the identification information comprises at least one serial number of the receiver. The identification information of the transmitter can be transmitted via an administration interface, such as a serial interface. To advantage, with the aid of the identification information received, the receiver can determine a public key of the transmitter. On the basis of this public key, it is then possible for the receiver to verify with certainty a response which is received from the transmitter. In consequence, in an advantageous manner, the receiver does not require any secret key material to carry out a reliable check on the messages from the transmitter. Even if an attacker were to determine the identification information or the public key of the transmitter, he could not use these to reconstruct messages from the transmitter. To do this would require the private key of the transmitter which is allocated to the public key of the transmitter.

In a further embodiment, on the basis of the response which is determined an integrity key is derived by the transmitter and, in order to protect the integrity of the challenge, a cryptographic check sum is transmitted with the integrity key via the challenge. This has the advantageous effect that the integrity of the challenge is also guaranteed with the unidirectional transmission. The cryptographic check sum can be calculated over the entire challenge or over a part of the challenge.

The inventors also propose a method for the checking of a transmitted signal protected in this manner. In this method the challenge transmitted and the response pertaining to it are received by a receiver. The received challenge is then checked to see whether the counter value used in the challenge is greater than a counter value previously stored by the transmitting transmitter. The response received is checked on the basis of the challenge. Following successful checking of the challenge and response, the control command transmitted in the challenge is executed.

The inventors propose a transmitter that carries out the method for the transmission of a signal with a unidirectional communications link which is protected by an asymmetric cryptography method.

In a further embodiment, the transmitter exhibits a security module for the efficient and secure execution of cryptographic operations. The security module provides protection against technical software attacks as well as against physical attacks or side channel attacks.

The inventors propose a receiver that performs the proposed method for the checking of a unidirectionally transmitted signal which is protected by an asymmetric cryptography method.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows a sequence diagram of a variant with a security module, of the proposed method, FIG. 3 shows a sequence diagram of a further variant, with an additional integrity protection for the transmitted challenge, of the proposed method.

DETAILED DESCRIPTION OF THE PREFERRED EMBODIMENT

Figure 1:
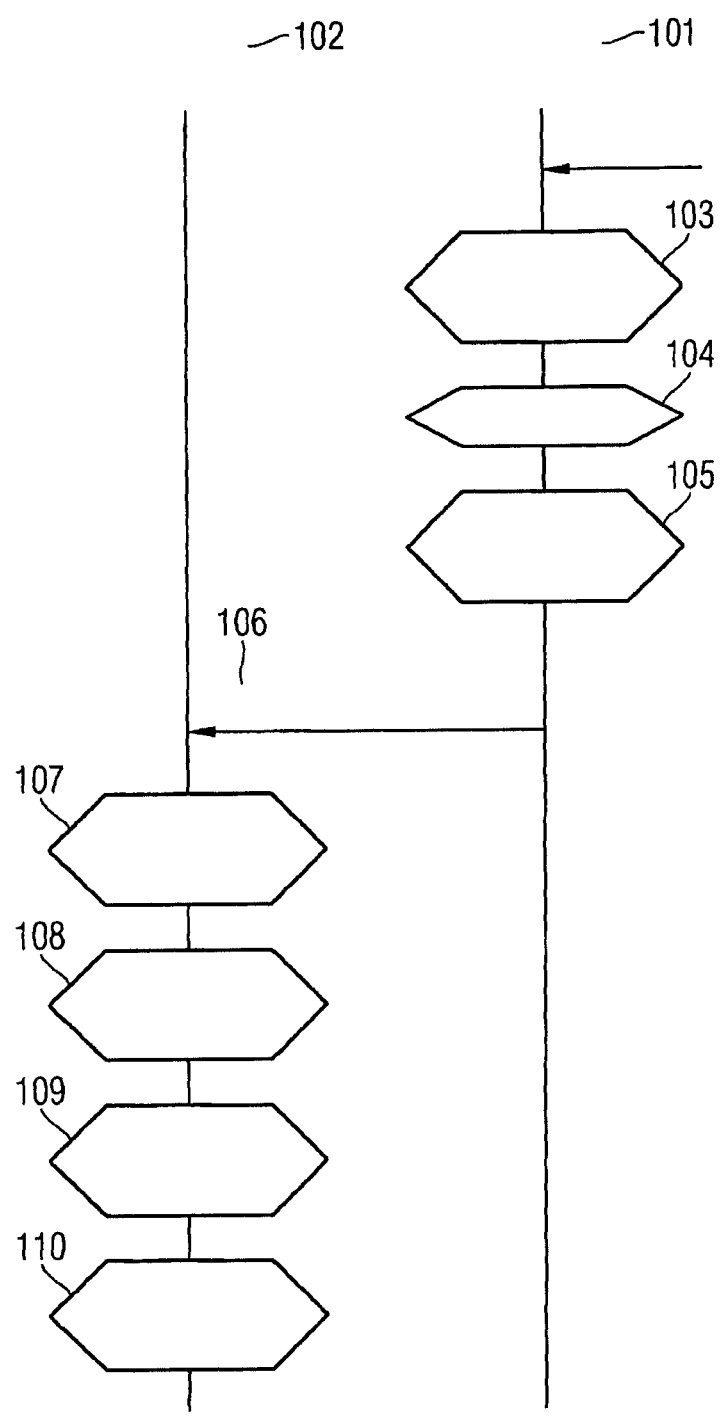
FIG. 1 shows a sequence diagram of a proposed method for the secure unidirectional transfer of a signal.

Reference will now be made in detail to the preferred embodiments of the present invention, examples of which are illustrated in the accompanying drawings, wherein like reference numerals refer to like elements throughout.

FIG. 1 shows in a sequence diagram a method for the secure transmission of a signal. The transmission in this situation takes place in one direction only, i.e. unidirectionally, from a transmitter 101 to a receiver 102.

The transmitter 101 determines, in a first step 103, a challenge, which comprises a counter value and a control command. The counter value is incremented at each transmission procedure, and serves to prevent replay attacks, in which a tapped message is sent by an attacker. The control command is, for example, in the case of a remote control for a television, a command to switch the device on or off, or a command to change the volume. With wireless sensors, the control command is, for example, a sensor value such as temperature or pressure.

In the next step 104, the counter value of the transmitter is incremented. Subsequently, on the basis of the challenge determined, the transmitter 101 determines a response 105. The determined challenge and the determined response are then transmitted 106 from the transmitter 101 to the receiver 102.

The receiver 102 now checks, in a first step 107, whether the response received matches the challenge received. In a nest step, the transmitter 102 checks whether the challenge received is valid 108. In this situation, a check is made, for example, as to whether the counter value of the transmitter used in the challenge is greater than the counter value previously received by this transmitter. If both the check of the response as well as the check of the challenge are successful, the reference information of the transmitter 101 deposited in the receiver 102 is adjusted 109. To do this, for example, the counter value stored for this transmitter is incremented. Subsequently, the control command included in the challenge is executed 110.

However, should the check of the response or the challenge be unsuccessful, the reference information of the transmitter concerned will not be adjusted, and the corresponding control command will not be executed.

It is of course at the discretion of the person skilled in the art whether to carry out the method in another sequence or at least partially in parallel.

The security of asymmetric cryptography methods is based on the use of a private and a public key. The private, secret key in this situation is only available to the checker, while the public key can in principle be accessible to anyone. In the method described, therefore, the security is based on the principle that the response can only be determined from the challenge with a knowledge of the private key. Only the transmitter knows the private key, however. With the public key, by contrast, it is only possible to check whether a response matches a challenge, and therefore the transmitter had knowledge of the private key. With the public key, however, it is not possible to determine a matching response on the basis of a challenge. It would therefore be no problem at all if the public key in the possession of the receiver were to be determined by an attacker.

In a further embodiment, the message comprising the challenge is transmitted several times, in order that, even in the event of transmission errors, the control command can be reliable recognized by the receiver. In this situation, the counter value can be increased with each message, or remain unchanged with the repeated transmission of the message.

In the event of repeated transmission of a message with an unchanged counter value, the receiver will accept this same counter value for as long as messages with this counter value are received with a certain predeterminable regularity. As soon as no message with this counter value is received for a predeterminable period of time, this counter value will become invalid. A check can additionally be made as to whether the same control command is being transmitted with this counter value.

In order to familiarize a receiver with a transmitter an item of identification information is transferred from the transmitter to the receiver in a learning phase. The identification information is, for example, a serial number, a digital certificate containing the public key, or the public key itself.

The identification information from the transmitter can be input during the learning phase by way of an administration interface, such as by way of a personal computer with a serial interface. In an automated learning process, the receiver is placed into a learning mode, and in this period of time stores identification information from those transmitters which transmit a control command. In order to initiate the learning mode, a special button can be used, for example, or a mechanical key-actuated switch on the receiver.

The identification information from the transmitter is stored directly by the receiver, or only after a validity check, for example of a digital certificate.

FIG. 2 shows in a sequence diagram a method for the secure transmission of a signal with a security module. In this situation the transmission takes place in one direction only, i.e. unidirectional, from a transmitter 201 to a receiver 202.

In order to avoid repetition for FIG. 2, reference is made to the corresponding parts of the description in FIG. 1. For identification, the corresponding elements in FIGS. 1 and 2 are provided with the same reference characters.

Contrary to the method shown in FIG. 1, in the method according to FIG. 2 a security module 203 is used in the transmitter for the determination of the response. The security module 203 is designed for the efficient and secure performance of cryptographic operations, and protects against technical software attacks as well as against physical attacks and side channel attacks.

To do this, after an incrementing of the counter value 104 the challenge which is determined is provided to the security module 203. Subsequently the security module 203 of the transmitter 201 determines a response 205 on the basis of the challenge determined. The response determined is in turn provided 206 to the transmitter by the security module 203. The challenge determined and the response determined are finally transmitted 106 by the transmitter 201 to the receiver 202. The remainder of the process sequence then corresponds again to the process sequence known from FIG. 1. It is also possible for the security module to be initialized with a corresponding counter value and for the incrementing to be carried out directly in the security module. This has the advantage that the counter value cannot be manipulated.

FIG. 3 shows in a sequence diagram a method according for the secure transmission of a signal with an additional integrity protection for the challenge transmitted. The transmission in this situation takes place in one direction only, i.e. unidirectional, from a transmitter 301 to a receiver 302.

In order to avoid repetition for FIG. 3, reference is made to the corresponding parts of the description for FIG. 1. For identification, the corresponding elements in FIGS. 1 and 3 are provided with the same reference characters.

In this embodiment of the method, the challenge is transmitted protected with the use of the response value. To do this, a symmetrical key is derived from the response value, or the response value is used directly as a symmetrical key 303. The derivation can take place in this situation, for example, by a hash function. With this symmetrical key determined, a cryptographic check sum is calculated 304, which comprises the counter value and the control command. Examples of a hash function are MD6, SHA-1, SHA-256. The check sum can be calculated, for example, by an HMAC-MD5, HMAS-SHA1, HMAC256, or AES-CBC-MAC function.

The challenge and the check sum are transmitted 305 by the transmitter to the receiver. The receiver now stores the challenge and the check sum, and determines a time window for a valid reception period of the response 306 pertaining to it. The transmitter 301 starts a time measurement 307 and transmits the response to the receiver in the valid time window 308. In order to increase security still further, in this exemplary embodiment the challenge and check sum are accordingly transmitted first, and the response only at a later point in time.

The receiver 302 now checks in a first step 309 whether the challenge received is valid. In this situation a check is made, for example, to determine whether the counter value of the transmitter used in the challenge is greater than the counter value previously received from this transmitter. The receiver 302 for its part now further determines, on the basis of the response received, the symmetrical key. Thereafter the receiver checks, on the basis of the symmetrical key, whether the challenge received matches the check sum received.

The receiver then checks whether the response received matches 301 the challenge. Finally, the receiver additionally checks whether the response was received in the valid time window. The remaining process sequence then again corresponds to the process sequence known from FIG. 1.

It is of course at the discretion of the person skilled in the art to carry out the process steps represented in another sequence or at least partially in parallel.

Application situations described are, for example, Bluetooth foot-actuated switches for medical equipment, garage door openers, radio keys for access to a building or vehicle, or control in a domestic network (such as roller blinds or light switches).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for transmitting a signal via a unidirectional communications link, protected by an asymmetric cryptography method, comprising:
   incrementing, at a transmitter, a counter value, the counter value being incremented based on occurrence of a transmission procedure;
   determining, at the transmitter, a challenge based on the counter value and a control command executable by a receiver;
   determining, at the transmitter, a response based on the challenge using a private key of the asymmetric cryptography method;
   deriving an integrity key at the transmitter based on the response, and generating a cryptographic checksum with the integrity key via the challenge to protect the integrity of the challenge; and
   transmitting the challenge, the cryptographic checksum, and the response, from the transmitter to the receiver.

2. The method as claimed in claim 1, wherein the challenge is repeatedly transmitted to ensure successful reception.

3. The method as claimed in claim 2, wherein
   the transmission procedure is transmission of the challenge, and
   the counter value is increased with each transmission of the challenge.

4. The method as claimed in claim 2, wherein
   the transmission procedure is transmission of the challenge, and
   the counter value is incremented with a first transmission of the challenge and then the counter value remains unchanged when the challenge is repeatedly transmitted.

5. The method as claimed in claim 1, wherein for initializing, the receiver stores an item of identification information of the transmitter, and the identification information comprises at least one serial number of the transmitter.

6. The method as claimed in claim 5, wherein the identification information comprises a digital certificate or a public key of the transmitter.

7. A method for checking a signal transmitted, comprising:
   receiving at a receiver from a transmitter, a challenge, a cryptographic checksum based on an integrity key, and a response pertaining to the challenge, the response being generated based on the challenge using a private key of an asymmetric cryptography process, the integrity key being derived by the transmitter based on the response, and the cryptographic checksum being generated using an integrity key via the challenge to protect the integrity of the challenge;
   checking, by the receiver, the challenge to determine whether a counter value used in the challenge is greater than a counter reference value previously stored by receiver;
   checking, by the receiver, the response based on the challenge; and
   after successful checking of the challenge and the response, executing, by the receiver, a control command used in the challenge.

8. The method as claimed in claim 7, further comprising storing the counter value at the receiver after each successful reception of a valid challenge, the counter value being stored as an updated counter reference value.

9. A transmitter device for unidirectional communications using asymmetric cryptography, comprising:
   a counter having a counter value incremented based on occurrence of a transmission procedure;
   a challenge device to determine a challenge based on the counter value and a control command executable by a receiver;
   a response device to:
      determine a response based on the challenge using a private key of an asymmetric cryptography process; and
      derive an integrity key based on the response, and generate a cryptographic checksum with the integrity key via the challenge to protect the integrity of the challenge; and
   a transmitter to transmit the challenge, the cryptographic checksum, and the response to the receiver.

10. The transmitter device as claimed in claim 9, wherein a security module provided in the transmitter device securely executes cryptographic operations and protects against technical software attacks, physical attacks and side channel attacks.

11. A receiver device comprising:
   a receiver to receive, from a transmitter, a challenge, a cryptographic checksum based on an integrity key, and a response pertaining to the challenge, the response being generated based on the challenge using a private key of an asymmetric cryptography process, the integrity key being derived by the transmitter based on the response, and the cryptographic checksum being generated with an integrity key via the challenge to protect the integrity of the challenge;
   a checking device to:
      check the challenge to determine whether a counter value used in the challenge is greater than a counter reference value previously stored by receiver; and
      check, using a public key known to the receiver, whether the response matches the challenge, wherein a positive determination that the response matches the challenges verifies that the response was generated using the private key; and
   a processor to execute a control command used in the challenge, after successful checking of the challenge and the response.

* * * * *